Jan. 10, 1939.　　　A. R. ALLARD　　　2,143,462

METHOD OF MANUFACTURING TURBINE DIAPHRAGMS

Filed July 30, 1936　　　4 Sheets-Sheet 1

INVENTOR
ARTHUR R. ALLARD.
BY
ATTORNEY

Jan. 10, 1939.   A. R. ALLARD   2,143,462
METHOD OF MANUFACTURING TURBINE DIAPHRAGMS
Filed July 30, 1936   4 Sheets-Sheet 2

WITNESSES:
James K. Mosser
C. L. Wheeler

INVENTOR
ARTHUR R. ALLARD
BY
a. B. Rewis
ATTORNEY

Jan. 10, 1939.  A. R. ALLARD  2,143,462
METHOD OF MANUFACTURING TURBINE DIAPHRAGMS
Filed July 30, 1936  4 Sheets-Sheet 4

WITNESSES:

INVENTOR
ARTHUR R. ALLARD.
BY
ATTORNEY

Patented Jan. 10, 1939

2,143,462

UNITED STATES PATENT OFFICE 2,143,462

METHOD OF MANUFACTURING TURBINE DIAPHRAGMS

Arthur R. Allard, Drexel Hill, Pa., assignor to Westinghouse Electric & Manufacturing Company, East Pittsburgh, Pa., a corporation of Pennsylvania Application July 30, 1936, Serial No. 93,514

4 Claims. (Cl. 29—156.8)

My invention relates to a turbine blading assembly, and it has for an object to provide an improved assembly as well as a method and apparatus for the production thereof.

A more particular object is to provide a method of manufacturing turbine diaphragms from parts made from stock material so that both the cost and time required for manufacture may be reduced.

In accordance with my invention, nozzle vanes or blades, cut from pre-formed stock, are welded at their inner ends to the periphery of a carrying or supporting member. Each blade is welded on the side thereof remote from the previously welded blade, so that the weld is accessible for the removal of excess weld metal before the next blade is welded. Preferably, the periphery of the carrying member is formed with transverse grooves to receive the inner ends of the blades or vanes, and one side of each groove is conjugate to one side of a blade while the other side of the groove is spaced from the blade to provide a recess for the reception of weld metal securing the blade to the disk member. After all the blades are thus attached, an outer ring is secured to the outer ends of the blades. Preferably, the outer ring is cast so as to incorporate the outer ends of the blades, and the outer blade ends may be formed with apertures therein to provide firm anchorage in the cast outer ring. A more particular object of my invention is not only to provide a blading assembly, such as a diaphragm, having the characteristics of this mode of manufacture, but also an improved process and apparatus for the production thereof.

A more particular object of my invention is to weld blade or vane elements to a group of diaphragm members, the blade elements being welded, one at a time, to the diaphragm members in succession and a connected blade element and diaphragm member being moved from the assembling and welding location to a location for the removal of surplus weld metal, the welding occurring at the side of the blade elements in the direction of blade element assembly so as to provide adequate space for welding and metal removal operations.

A further object of my invention is to provide an improved method and apparatus for the manufacture of turbine diaphragms wherein a plurality of diaphragm plates having peripheral slots are carried by work holders, the arrangement and operation being such that blade sections are welded in the grooves of the plate members, the blade elements being welded one at a time to the plate members in succession.

A further object of my invention is to provide an improved method and apparatus for the manufacture of turbine diaphragms wherein a circumferential series of work holders, each carrying a diaphragm plate member, are brought successively into a first position where a blade element is welded to the plate member, and to a second position where excess weld metal is removed.

A further object of my invention is to provide improved turbine blade elements having their inner ends connected to a plate member and having their outer ends incorporated within an arcuate cast structure.

These and other objects are effected by my invention as will be apparent from the following description and claims taken in connection with the accompanying drawings, forming a part of this application, in which:

Figure 1:
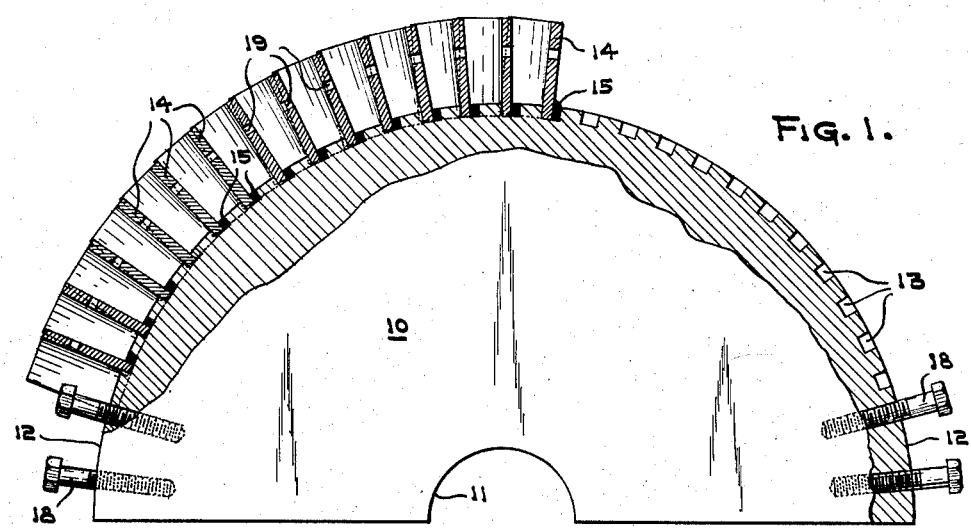
Fig. 1 is an elevational view, partly in section, showing a disk member having a portion of the blade row attached thereto.

Referring now to the drawings in detail, there is shown a disk member 10, of semi-circular form, having a recess 11 to provide for the spindle opening in the complete diaphragm consisting of a pair of complementary members.

Figure 2:
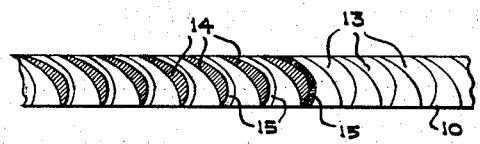
Fig. 2 is a plan view, partly in section, of the structure shown in Fig. 1.

After cutting a disk member from suitable stock, transverse grooves 13, shown in Figs. 1 and 2, are then formed in the periphery 12 in any suitable manner, as by milling, for the reception of inner ends of blade or vane elements 14, one side of each groove being conjugate to one side of a blade element. In the embodiment shown in Figs. 1, 2, and 3, the convex side of each groove is conjugate to the concave side of its blade, and the concave side of the groove is similar in form to the convex side of the blade but spaced therefrom to provide a recess of approximately uniform width for the reception of weld metal.

The blades 14 are welded in the grooves 13 of the disk member 10 one by one and beginning with the left-hand end of the row as seen in Fig. 1. With a blade 14 properly positioned in the first groove 13 so that its concave side abuts against the convex side of the groove, welding, preferably, arc welding, occurs at the convex side, the end of the welding rod being insertable in the recess formed by the remaining portion of the groove not occupied by the blade end. The recess is filled with weld metal 15, which forms an autogenous connection of the convex blade side with the groove bottom and side and provides a body completely filling the recess and firmly bracing the inner blade end in position. Surplus weld metal is removed in any suitable manner, as by cutting or grinding, to provide a smooth, finished top surface of the weld approximately reforming the peripheral surface.

After removing excess metal of the weld, a blade is inserted in the next slot and welded, followed by machining and so on, the blades being attached successively from the left to the right in Fig. 1 and welding and machining occurring at the forward side in the direction of assembly on account of the space required for those operations.

An outer ring 16 is then cast to the outer ends of the blades. When the blade row does not extend fully to the line of division between the two halves of the diaphragm, the outer ring is preferably extended to and cast directly onto the periphery of the disk member 10 beyond the end of the blade row, as shown at 17 in Fig. 3. Suitable means, such as tap bolts 18 screwed into the disk member 10, may be provided to secure a firm connection between the disk member and the outer ring 16. The outer end portions of the blades that are cast into the outer ring are preferably formed with openings 19 to provide more secure connection therebetween.

Figures 4, 5:
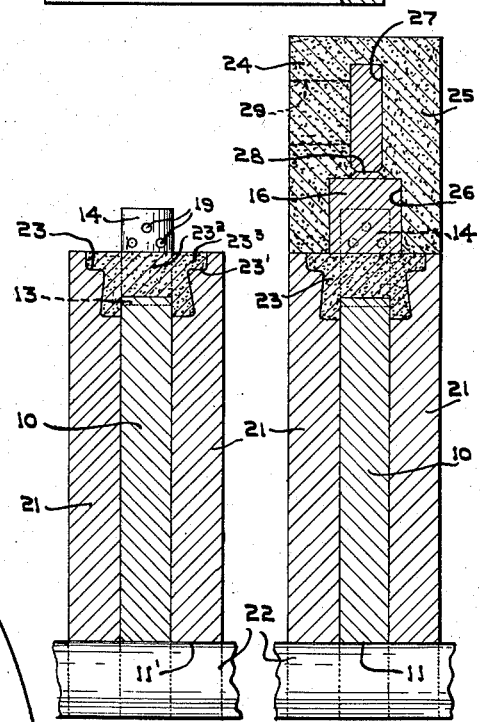
Fig. 4 shows the disk and blade structure prepared for molding.
Fig. 5 is a similar view including the mold.

Referring now to the casting operation, the portion of the space between adjacent blades that is to constitute the motive fluid passage is filled with any suitable core material. Side plates 21, shown in Figs. 4 and 5, are clamped on opposite sides of the disk member. The side plates may be positioned in any suitable manner, as by providing the same with recesses 11' registering with the recess 11 in the disk member 10 and positioning an arbor 22 in the registering recesses. The side plates are also formed with recesses 23, so as to provide core material on opposite sides of the blade row. The core material is tamped so as to extend to the cylindrical surface defined by peripheries of the side plates, the outer end portions of the blades, containing the openings 19, projecting beyond the core material for incorporation in the cast outer ring. Preferably the recesses are undercut so that they, with the periphery of the disk member and said cylindrical surface, define an arcuate space of dovetail cross-section so as to hold the core material in place.

The assembly, as shown in Fig. 4, is then placed in a mold for casting of the outer ring 16. As shown in Fig. 5, the mold comprises a cope 24 and a drag 25. The cope and the drag have concave cylindrical surfaces fitting the cylindrical surface of the side plates and of the core material and they cooperate with the latter cylindrical surface to provide an arcuate space 26 for the outer ring 16, into which recess the outer ends of the blades project. The drag 25 is formed with a passage 27 extending along the recess 26 and communicating therewith at spaced intervals through passages 28. The cope 24 is also formed with a passage 29 for pouring the molten metal into the passage 27. After the casting operation, the diaphragm structure is removed from the mold, the metal filling the passages 27, 28, and 29 is broken off from the outer ring 16, and the core material is removed. The disk member 10 and the outer ring 16 are then finished machined to form one-half of a complete turbine diaphragm.

While, in Figs. 4 and 5, I show the side plates 21 held in position with respect to the mating mold parts 24 and 25, it is to be understood that the plates 21 may be removed after the core material is tamped in, as shown in Fig. 4, the dovetail arcuate space being so formed as to present an outer cylindrical surface against which the inner cylindrical surfaces of the mating mold parts bear, as shown in Fig. 5. For example, I show the recesses 23 having counter recesses 23' so that the core 23$^2$ will have flange portions 23$^3$ serving this purpose.

Figure 3:
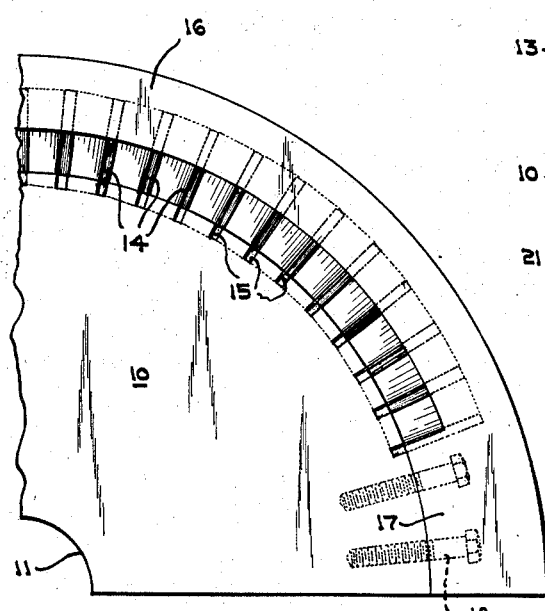
Fig. 3 is a partial side elevation of a complete diaphragm member.
Figure 6:
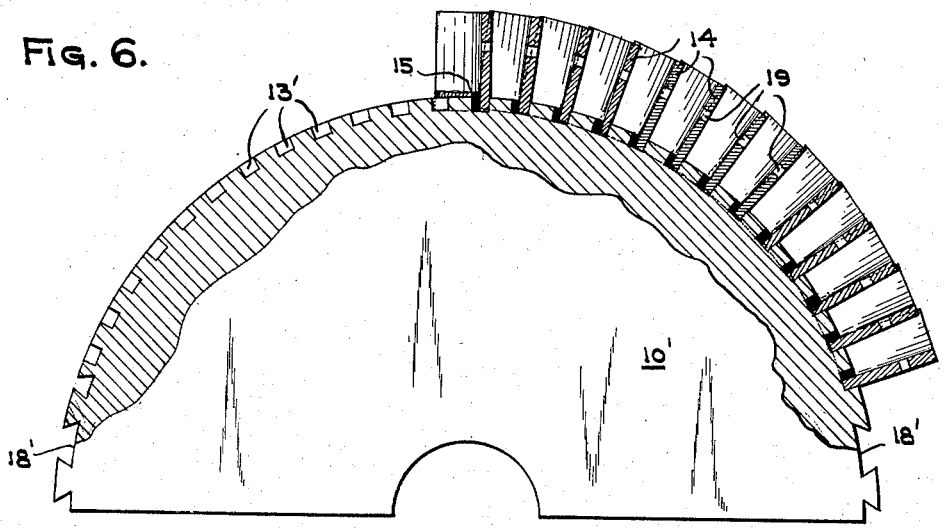
Fig. 6 is a view similar to Fig. 1 showing a modification.
Figure 7:
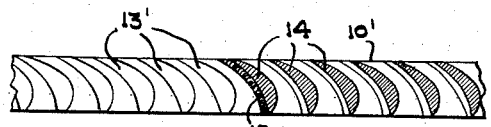
Fig. 7 is a view similar to Fig. 2 also showing the modification.
Figure 8:
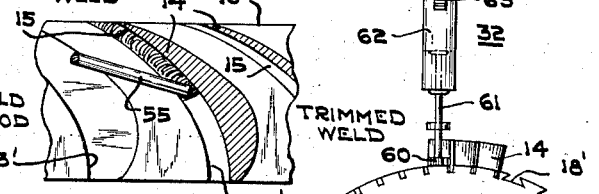
Fig. 8 is an enlarged plan view showing a weld partially completed.
Figure 10:
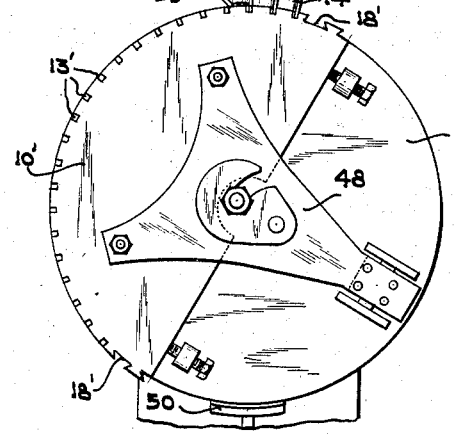
Fig. 10 is a partial elevational view of the machine as seen from the left in Fig. 9 and showing the "1st position" in which the blades are welded to the disk member.
Figure 11:
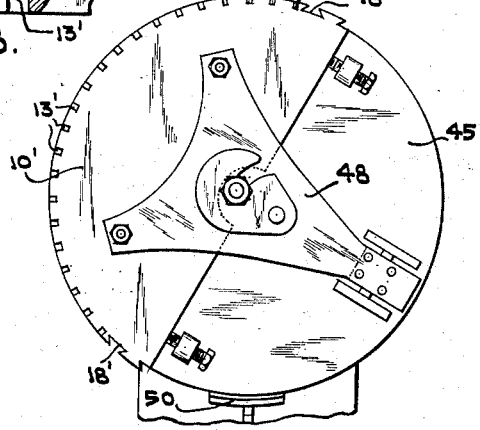
Fig. 11 is a similar view of the machine as seen from the right in Fig. 9 and showing the "3rd position", in which a milling cutter is used to remove excess weld material.
Figure 9:
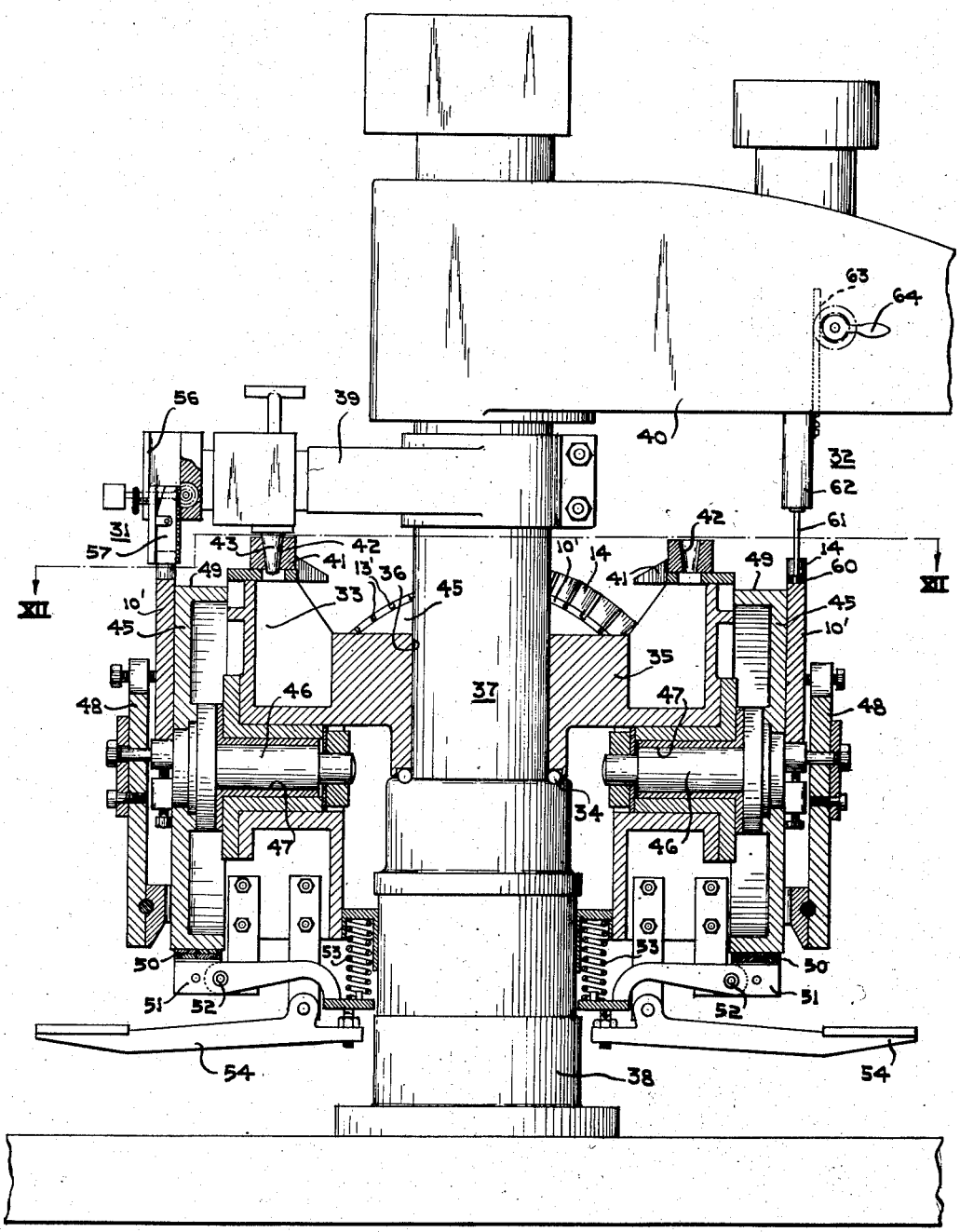
Fig. 9 is a vertical section of the machine for attaching blades to disk members.

In Figs. 6, 7, and 8, I show another embodiment of my invention which is similar to that shown in Figs. 1, 2, and 3, except that in this case, each blade abuts against the concave side of the groove 13', the latter being formed conjugate to the convex side of the blade. The convex side of the groove is formed approximately similar to the concave side of the blade, in spaced relation therewith, to provide a recess for the reception of weld metal.

The blade at the right-hand end of the row, as seen in Fig. 6, is first attached, and then the remaining blades are successively attached from the right-hand end to the left-hand end of the row. Each blade is attached by positioning the same to extend radially from the groove 13' with the convex side of the inner end portion abutting the concave side of the groove. The blade is welded by depositing weld metal in the recess formed by the groove at the concave side of the blade. This embodiment is particularly suitable when it is desired to use a milling cutter to remove the surplus welding material, inasmuch as the concave side of the blade approximates the arc of a circle. It is possible, by the use of such a milling cutter to remove most of the surplus weld metal, the remaining portion being removed by hand as in the first embodiment.

In Fig. 6, I show dovetailed grooves 18', into which molten metal forming the outer ring 16 may flow to provide a firm connection between the outer ring and the disk member 10'.

Preferably the blades are assembled, one at a time, on a plurality of diaphragm members in succession. To this end, there is provided a circumferential group of work holders arranged in relation to a blade assembling and welding location and a cutting or trimming location such that, when one diaphragm member is properly located with respect to the assembling and welding location, another will be preferably placed at the machining location, whereby operations of welding, cooling, machining, and finishing may take place concurrently at different locations.

Figures 12, 13:
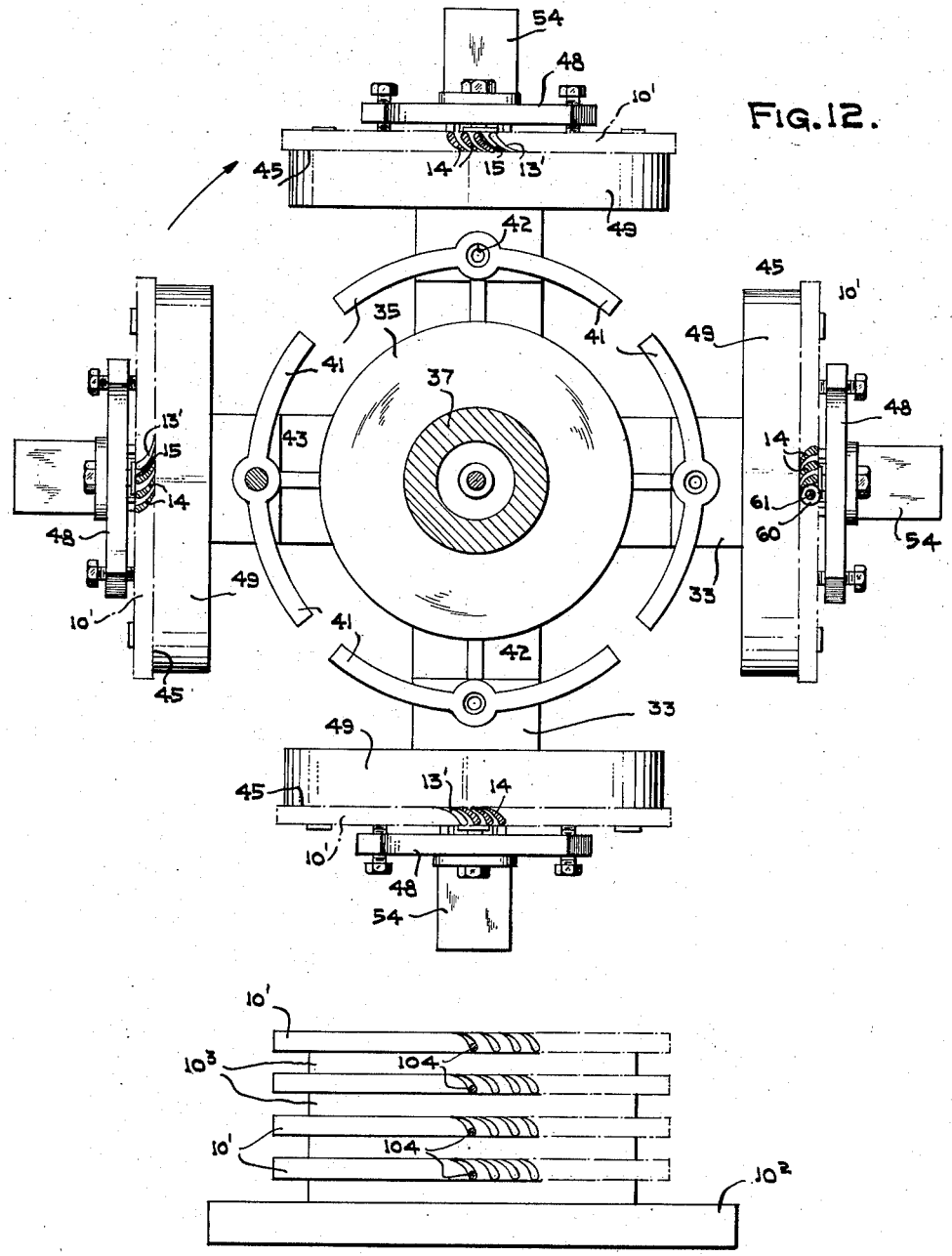
Fig. 12 is a horizontal view of the machine as seen along the line XII—XII of Fig. 9; and, Fig. 13 is an elevational view of a stack of disk members in position for milling peripheral grooves therein.

The grooves 13 or 13' in the periphery of the disk member may be formed in any suitable manner. I prefer, however, to form the grooves in four disk members at a time, inasmuch as the above-described machine applies blades thereto in groups of four. In Fig. 13, I show a group of four disk members 10' stacked on a table 10². Spaces 10³ are arranged between adjacent disk members. A gang of four milling cutters 10⁴ is arranged to mill corresponding grooves in the four disk members at one time. The form of the opposite sides of the groove is provided by relative movement of the milling cutters and the disk members, which may be effected in any desired manner, as by means of a suitable cam.

More particularly, in Figs. 7 to 12, inclusive, there is shown a blade holder, at 31, and a milling cutter, at 32, together with a group of equidistantly spaced work holders 33 movable so that, when one is in proper relation with respect to a blade holder, at 31, another will be in proper relation with respect to the cutter, at 32.

As shown, the work holders 33 are carried by a turntable or cage 35 having a central bearing 36 engaging the spindle 37 provided on the center post 38. Above the spindle, radial arms 39 and 40 are connected to the center post and carry, at their outer ends, respectively, the blade holder, at 31, and the cutter, at 32.

The blade holder, at 31, and the cutter, at 32, are spaced apart in relation to the spacing of the work holders 33 so that, with one work holder in proper relation to the blade holder another will be in proper relation to the cutter. Therefore, the turntable is provided with an indexing ring 41 provided with a tapered opening 42 for each work holder and a tapered pin 43 carried by the arm 39 cooperates with the openings 42.

While the indexing device assures of predetermined relations of the turntable with respect to the blade holder and the cutter, it is necessary to provide for angular adjustment of each work holder with respect to the turntable in order that the diaphragm grooves may each be brought into proper relation with respect to the blade holder, adjustment relatively to the turntable to secure the proper location for blade assembly and welding also assuring proper location for removal of excess weld metal.

Each of the work holders is preferably comprised by a face plate 45 carried by an arbor 46 fitting a bearing 47 provided on the turntable 35. Each face plate 45 is provided with a clamping device 48 so as to hold a diaphragm member 10' in proper position with relation thereto. Also, the face plate has a brake drum 49 and a cooperating brake shoe 50 carried by one end of a lever 51, fulcrumed at 52 and having the force of the spring 53 exerted on the other end thereof in such manner that the spring force normally tends to engage the brake shoe with the brake drum. The brake is released by means of a treadle 54, which serves to relieve the spring force and to raise one end of the lever 51.

Assuming that each of the work holders 35 carries a diaphragm 10', then the turntable 35 is moved to bring one of the work holders in proper relation with respect to the blade holder, at 31, the turntable being moved for this purpose until the pin 43 may engage one of the openings 42. Then the brake is released and the work holder is turned to aline the first groove with the blade carried by the blade holder, at 31, and the latter is lowered to cause the lower end of a blade to engage in the groove. With the brake released, the work holder is given final angular adjustment to assure contact of one side of the blade with one side of the groove, a recess being left between the other side of the blade and the other side of the groove. The recess is filled with weld metal, secured, for example, from an electric arc weld rod 55; and, when the recess is completely filled, the blade holder and the indexing pin 43 are both raised and the second work holder is brought into position with respect to the blade holder. As soon as the first work holder reaches the machining location, the milling cutter, at 32, is lowered for the purpose of removing surplus weld metal.

With the first blade welded in the first groove of each diaphragm and surplus weld metal removed, the first diaphragm returns to the blade assembling and welding location and is angularly adjusted to bring the second groove into proper relation, as before, and the operations indicated are repeated. Thus, it will be seen that the blades are welded, one at a time, to the diaphragm members in succession, the welding being followed by removal of surplus weld metal, and the welding and machining operations occur at the forward side in the direction of blade assembly so that adequate room exists for such operations.

Reference has already been made to raising and lowering of the blade holder and the cutter incident to blade assembly and machining. The devices are raised so as not to interfere with indexing movement and they are lowered incident to the assembly and machining operations.

The blade holder, at 31, may be of any suitable type. For example, I show the holder comprised by a guide 56 formed in the outer end of the arm 39 and by a slide 57 fitting the guide, the slide being arranged to receive a blade. With the slide in upper position and a blade inserted, it is in condition to be lowered for insertion of a blade in a groove.

Likewise, the cutter, at 32, may be raised and lowered in any suitable manner. By way of example, there is shown, a rotary cutter 60 carried by the lower end of the shaft 61 mounted in the body 62 carried by the arm 40 and raised and lowered by rack and pinion mechanism 63 actuated by the lever 64.

The operation of the apparatus illustrated in Figs. 9 to 12, inclusive, is as follows:

Each of the work holders 33 has a disk member 10' provided with grooves 13' extending across the periphery thereof and mounted thereon so as to be concentric with its arbor. With a blade 14 fastened in the blade holder, at 31, and with the turntable held in one of its positions by the indexing device, the brake of the work holder adjacent to the blade holder is released in order that the first groove or slot 13' of the disk member may be approximately alined with the blade 14 carried by the blade holder. Thereupon, the blade holder is lowered to insert the lower end of the blade in the first groove 13' and, with the brake released, the work holder is turned sufficiently to secure abutment of the convex side of the blade with the concave side of the slot, the slot having greater circumferential extent than the blade so that a recess is left between the concave side of the blade and the convex side of the slot for the reception of weld metal, and with the blade and slot surfaces contacting, the brake is allowed to reengage so as to secure the work holder in fixed relation with respect to the turntable or cage. Thereupon, the recess is filled with weld metal, an electric weld rod 55 being conveniently used for this purpose. After welding, in the first position, the indexing pin 43 is released so that the turntable may be advanced to bring the next work holder into the first or welding position, the first work holder having been advanced to a second position. Since, with the apparatus shown, there are four work holders spaced 90° apart, the cutting device at 32, is preferably located at the third position, this location providing adequate time for the weld to cool, no work in connection therewith being carried on in the second position. With a weld in the third position, the cutting device, at 32, is lowered to bring the circular cutter, conforming closely to the concavity of the blade, into engagement with the weld so as to substantially remove all of the weld metal extending beyond the periphery of the disk member and laterally of the blade. From the third position, a work holder advances to the fourth position, where any metal not conveniently removed by the cutting device is removed in any suitable manner. In other words, after completion of welding in the first position, the weld moves progressively through second, third, and fourth positions, cooling occurring during the transit from the first to the third positions and removal of surplus metal taking place at the third and fourth positions, the removal of surplus metal being carried on to such a point that substantially smooth surfaces are provided to define the flow passages between the blades. Each work holder moves from the fourth or finishing position to the first position, whereupon its brake is released to permit of its arbor being adjusted angularly to aline approximately the next blade groove with the blade holder, the latter then being lowered to insert a blade in the groove and finally angular adjustment of the arbor being made so as to secure contact of the convex blade side with the concave side of the groove and then the brake is reengaged, the succeeding operations proceeding as already described. Thus, it will be seen that I provide for the assembling and welding of blades one at a time to a plurality of disk members in succession, the disk members being carried by work holders movable to welding and metal cutting positions, as indicated, the indexing device assuring that, with proper adjustment for the welding position, a weld will be in proper position to be trimmed or machined when the work holder reaches the weld trimming or cutting position, the reason for this being that, when the brake is reengaged, the workholder arbor is secured in fixed relation with respect to the turntable, the indexing device then assuring of equal increments of angular movement such that a weld will be properly located in the cutting position. As the turntable is moved step by step, it is necessary to elevate the blade holder and the cutting device to clear the tips of the blades, such devices being lowered incident to blade assembly and to trimming or cutting of excess weld metal.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. The method of manufacturing a vaned construction including a metallic holding member with metallic vanes having like ends autogenously connected to the holding member and comprising cutting vane-end-receiving grooves in the holding member; each of said grooves being so dimensioned, that, with positioning of a vane end therein with one face of the vane end abutting one side of the groove, clearance space is left between the other face of the vane end and the other side of the groove; positioning and holding vane ends one at a time in the grooves in succession so that one face of each vane end contacts with one side of its groove; and, while a vane end is positioned and held in one groove and before the end of the next vane is positioned in the next groove, depositing fused weld metal in the clearance space at the inserted blade end to effect an autogenous connection of the latter to the blade holding member.

2. The method of manufacturing a vaned construction including a metallic holding member with metallic vanes having like ends autogenously connected thereto and comprising cutting vane-end-receiving grooves in the holding member; each groove having one side wall conforming to one blade end face and being dimensioned so that, with positioning of a blade end therein with the conforming vane end face and groove side wall in contact, a clearance space is left between the other face of the vane and the other side wall of the groove; positioning and holding the vane ends one at a time in the grooves in succession so that the back face of each vane end, considered in the direction of vane assembly, contacts with the conforming wall of its groove; and, while a vane end is positioned and held in one groove and before the end of the next vane is positioned in the next groove, depositing fused weld metal in the clearance space for the inserted blade end to effect autogenous connection between the latter and the holding member.

3. The method of manufacturing a turbine member including a metallic plate having an arcuate periphery autogenously connected to ends of blades having convex and concave faces and comprising cutting blade-end-receiving grooves in the plate and transversely of the periphery of the latter; each of said grooves having convex and concave side walls and one of the latter conforming to one of the blade end faces and being dimensioned so that, with positioning of a blade end therein with the conforming blade end face and groove side wall in contact, clearance space is left between the other face of the blade end and the other side wall of the groove; inserting, positioning and holding the blade ends one at a time in the grooves in succession so that each blade end back face, considered in the direction of blade assembly, contacts with the back side wall of its groove; and, while each blade end is positioned and held in its groove and before the end of the next blade is positioned in the next groove, depositing fused weld metal in the clearance space for the inserted blade end to effect an autogenous connection between the latter and the plate element and then removing excess weld metal to provide a weld top surface which forms a continuation of the plate peripheral surface.

4. The method of manufacturing a bladed turbine member including a metallic plate having an arcuate periphery with blade ends autogenously connected to the latter and having convex and concave faces and comprising cutting blade-end-receiving grooves transversely of the periphery of the plate; each of said grooves having concave and convex side walls and the concave side wall conforming to the convex blade end face and being dimensioned so that, with insertion of a blade end therein with the convex face of the blade end abutting the concave side wall of the groove, clearance space is left between the concave face of the blade end and the convex side wall of the groove; positioning and holding the blade ends one at a time in the grooves in succession so that the convex face of each blade end at the back side thereof, considered in the direction of blade assembly, contacts with the back and concave side wall of its groove; and, while the blade end is positioned and held in one groove and before the end of the next blade is inserted in the next groove, depositing fused weld metal in the clearance space of the inserted blade end to effect autogenous connection between the latter and the plate and then removing excess weld metal to provide a weld top surface which forms a continuation of the plate peripheral surface.

ARTHUR R. ALLARD.